(12) United States Patent
Nakahashi et al.

(10) Patent No.: US 8,098,059 B2
(45) Date of Patent: Jan. 17, 2012

(54) CURRENT NEGATIVE-FEEDBACK CIRCUIT AND DC-DC CONVERTER USING THE CIRCUIT

(75) Inventors: Yasunori Nakahashi, Tokyo (JP); Satoshi Yamane, Saitama (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 517 days.

(21) Appl. No.: 12/371,060

(22) Filed: Feb. 13, 2009

(65) Prior Publication Data

US 2009/0273325 A1  Nov. 5, 2009

(30) Foreign Application Priority Data

Feb. 13, 2008  (JP) ................. 2008-031306

(51) Int. Cl.
*G05F 1/00*  (2006.01)
*G05F 1/40*  (2006.01)

(52) U.S. Cl. ........ 323/282; 323/271; 323/277; 323/284; 323/315; 363/74; 363/123

(58) Field of Classification Search .................. 323/268, 323/271, 272, 274, 277, 282, 283, 284, 285, 323/315; 363/74, 78, 123
See application file for complete search history.

(56) References Cited

U.S. PATENT DOCUMENTS

| 7,605,573 | B2 * | 10/2009 | Nishida .................. 323/282 |
| 2005/0200341 | A1 * | 9/2005 | Kohout et al. ............. 323/282 |
| 2006/0279965 | A1 | 12/2006 | Nakamura | |
| 2007/0182396 | A1 * | 8/2007 | Inatomi .................. 323/283 |

FOREIGN PATENT DOCUMENTS

| JP | 2001-245469 A | 9/2001 |
| JP | 2004-40856 A | 2/2004 |
| JP | 2006-345628 A | 12/2006 |

* cited by examiner

*Primary Examiner* — Matthew Nguyen
*Assistant Examiner* — Lakaisha Jackson
(74) *Attorney, Agent, or Firm* — Schwegman, Lundberg & Woessner, P.A.

(57) ABSTRACT

A current negative-feedback circuit comprises a current detection unit and a sawtooth-shaped waveform generation unit. The current detection unit comprises a first P-ch MOSFET Q2 and a second P-ch MOSFET Q3 which constitute a current mirror circuit, a current adjustment resistor R4, a current detection resistor R1, and a constant current source I1. The current mirror circuit outputs current almost proportional to the charge current of an inductance via a switching device or outputs a current which is the quadratic function of the charge current of an inductance. The sawtooth-shaped waveform generation means adds the constant charge current of the constant current source I2 and the current output from the current mirror circuit, charges the capacitor C1, and generates a sawtooth-shaped waveform.

9 Claims, 9 Drawing Sheets

F I G. 1

PRIOR ART

FIG. 2

PRIOR ART

FIG. 3 PRIOR ART

PRIOR ART

CURRENT NEGATIVE-FEEDBACK CIRCUIT AND DC-DC CONVERTER USING THE CIRCUIT

BACKGROUND OF THE INVENTION

RELATED APPLICATION

This application claims the benefit of priority, under 35 U.S.C. Section 119, to Japanese Patent Application Serial No. 2008-031306, filed on Feb. 13, 2008, which is incorporated herein by reference in its entirety.

1. Field of the Invention

The embodiments discussed herein are related to a current negative-feedback circuit for performing control in a current mode and to a DC-DC converter using the circuit, and more particularly are related to a current negative-feedback circuit capable of detecting current almost proportionally to inductance current for current mode control or capable of being a quadratic function of inductance current at a high speed using a simple circuit and capable of reducing the influence of switching noise and a DC-DC converter using the circuit.

2. Description of the Related Art

Figure 1:
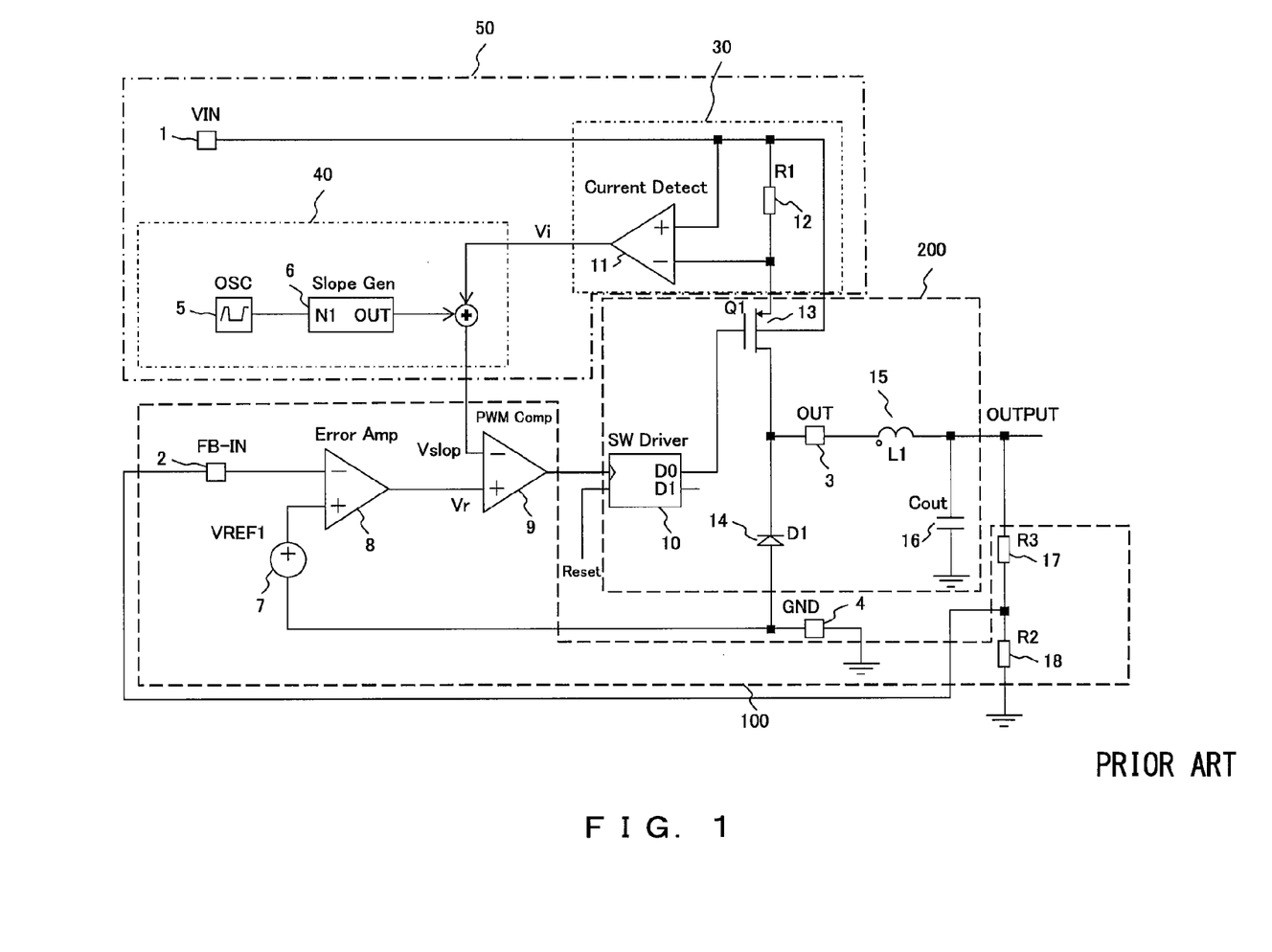
FIG. 1 shows an example configuration of the conventional current negative-feedback circuit and a buck type DC-DC converter using the circuit.

FIG. 1 shows configurations of a conventional current negative-feedback circuit and a buck type DC-DC converter using the circuit. There are many types of DC-DC converters, such as a buck type, a boost type, a buck/boost type, and an invert type, but the buck type DC-DC converter shown in FIG. 1 is described as a representative.

In FIG. 1, reference numerals 1, 2, 3, 4, 5, 6, 8, 9, 10, 11, 14, 16 respectively represent an input power source terminal (VIN terminal); a feedback voltage input terminal (FB-IN terminal) to which feedback voltage obtained by dividing the output voltage Vout of an output terminal (OUTPUT) connected to a load by resistors R3 (17) and R2 (18) as a detecting the voltage of the output voltage Vout; the output terminal (OUT terminal) of a circuit for controlling the energy accumulation /release (hereinafter energy accumulation and energy release are called 'charge' and 'discharge', respectively) of an inductor L1 (15); a ground terminal (GND terminal), that is, the second input power source terminal; an oscillator (OSC) for outputting clock signals; a slope generator (Slope Gen) for generating a signal for compensating for a slope; an error amplifier (Error Amp) for comparing feedback voltage with the reference voltage VREF1 (7) and outputting an error signal Vr; a PWM (pulse-width modulation )comparator (PWM Comp) for comparing the output Vr of the error amplifier 8 for compensating for a slope with the sum of the output of the slope generator 6 and the output Vi of a current detection circuit 11, and for converting/outputting the error signal Vr to a pulse width; a driver (SW (switch) Driver) for driving a switching device Q1 (13) for controlling the charging period of an inductor L1 (15); a current detection circuit (Current Detect) for detecting/outputting a signal proportional to the charge current (inductance current) of the inductor L1 (15) as the voltage drop of a detection resistor R1 (12); a diode (D1) for providing a current route running from the inductor L1 (15) to a load while the switching device Q1 (13) is off; and an output capacitor (Cout). In this case, the Current Detect 11 and the current detection resistor R1 (12) constitute a current detection unit 30; the OSC 5 and the Slope Gen 6 constitute a sawtooth-shaped waveform (also simply called a saw waveform) generation unit 40; the Error Amp 8, the reference voltage VREF1 (7), the PWM Comp 9 and the resistors R3 (17) and R2 (18) constitute an FB (feedback) control unit 100; and the SW (Switch) Driver 10, the switching device Q1 (13), the inductor L1 (15), the diode D1 (14), and the output capacitor Cout 16 constitute an output generation unit 200. Thus, the current detection unit 30 and the sawtooth-shaped waveform generation unit 40 constitute a current negative-feedback circuit 50.

Figure 2:
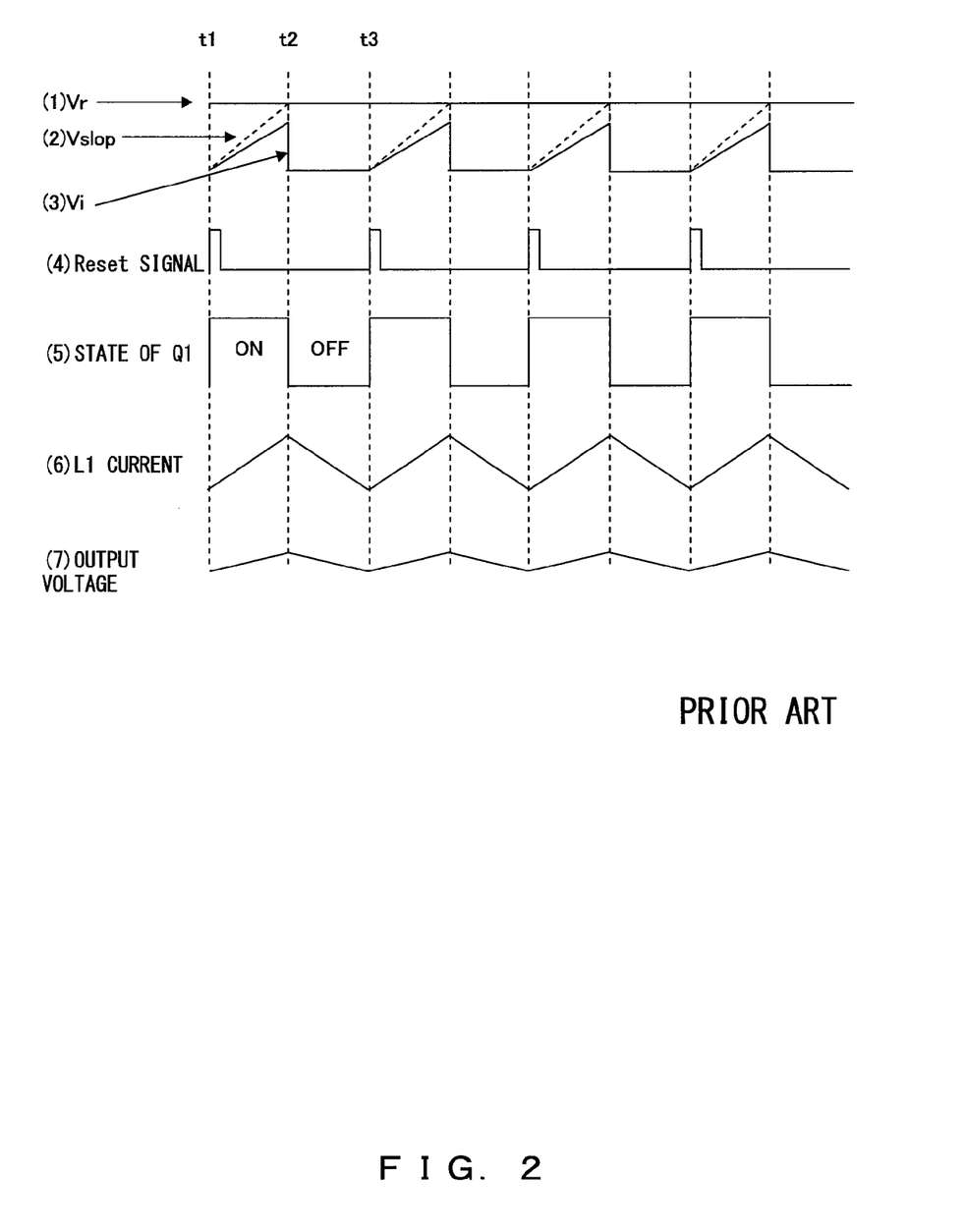
FIG. 2 illustrates the operational waveform of each unit illustrated in FIG. 1.

FIG. 1 shows a buck type DC-DC converter to which a circuit controlled in a current mode is applied and FIG. 2 illustrates the operational waveform of each unit. As illustrated in FIG. 2, when the switching device Q1 (13) is on, current flows from a power source, which is not illustrated in FIG. 1, to the inductor L1 (15) via the VIN terminal 1 and the switching device Q1 (13). When the switching device Q1 (13) is off, energy stored in the inductor L1 (15) is released so as to a load via the diode D1 (14). Therefore, the current of the inductor L1 (15) becomes L1 current (6) illustrated in FIG. 2. This state indicates that the current of the inductor L1 (15) is continuous. When the load decreases, the current of the inductor L1 (15) becomes intermittent. However, in this example, for the purpose of simple description the operation of the switching device Q1 (13) is described assuming that the current of the inductor L1 (15) is continuous.

The switching device Q1 (13) is switched on/off by the output of the PWM comparator 9 driving its gate high/low via the SW Driver 10. The PWM comparator 9 compares two input voltages, that is, the Vr illustrated in FIG. 1 and the signal Vslop (2) obtained by adding the output of the slope generator 6 to the Vi and controls in such a way that the switching device Q1 (13) can be switched on in a state in which the Vr (1) is larger than the increasing signal Vslop (2) (t1-t2 in FIG. 2). When Vslop (2) becomes equal to Vr (1) (that is, t2 in FIG. 2), the output of the PWM comparator 9 is inverted and the switching device Q1 (13) is switched off. The Vi is proportional to the current of the inductor L1 (15) during the on period of the switching device Q1 (13) and is obtained by measuring the voltage of the current detection resistor R1 (12) using the current detection circuit (Current Detect) 11. This Current Detect 11 is generally a circuit using an operational amplifier that is often used for high-side current measurement (for example, see Patent document 1). The Vr is the output of the error amplifier 8 and generates the waveform illustrated in FIG. 2. The output of the error amplifier 8, Vr, is obtained by amplifying the differential voltage between the reference voltage 7 and a voltage (voltage of the FB-IN terminal 2) obtained by dividing the output voltage Vout by division resistors R3 (17) and R2 (18). In FIG. 1, if the output voltage Vout is lower than a specified voltage, the output of the error amplifier 8 becomes high (the larger the difference between the output voltage Vout and a preset voltage, the higher the output of the error amplifier 8 becomes), and conversely if the output Vout is higher than a specified voltage, the output of the error amplifier 8 becomes low. The output voltage of this error amplifier 8 increases/decreases as illustrated in FIG. 2. If the Vr is low, t2 moves to the t1 side and if the Vr is high, t2 moves to the t3 side. By this movement, the duty ratio during the on period of the switching device Q1 (13) varies. If the on period is long, the output voltage increases and if the on period is short, the output voltage decreases. By this function, the output voltage Vout can be stabilized to a value expressed as follows:

$$Vout = VREF1 * (1 + R3/R2) \qquad (1)$$

(in the above equation, VREF1 is the reference voltage 7)

Although the sawtooth-shaped waveform is obtained by superimposing the output voltage of the slop generator 6 on Vi (3), this is obtained by composing (adding) the output of the slope generator 6 and the output of the current detection circuit 11. This is because a function of so-called slope compensation is realized. When current mode control is applied in a state in which the duty ratio during the "on" period of the switching device Q1 (13) is 50% or more, sub-harmonic oscillation sometimes occurs. This slope compensation is added in order to prevent this operation from becoming unstable.

The sub-harmonic oscillation and the slope compensation are described below. Firstly, when the DC-DC converter is in a stable or equilibrium state, the increased amount of L1 current (6) during t1 to t2 is the same as the decreased amount of L1 current (6) during t2 to t3. In this case, the fact that the duty ratio is 50% or more means that the inclination (increase ratio: m1) of the L1 current (6) during t1 to t2 is smaller than the absolute value (m2) of the inclination (decrease ratio: −m2) of the Li current (6) during t2 to t3 (m1<m2). Here a case in which the value of the L1 current (6) at t3 deviates slightly from the value of the L1 current (6) at t1 is considered. The value of the L1 current (6) at t3 becomes the value of the L1 current (6) at t1 in a subsequent cycle. However, in this case, if m1<m2, the deviation of the L1 current (6) at t1 increases (for example, see Patent document 2). This is called sub-harmonic oscillation. Conversely, if m1>m2, the deviation of the L1 current (6) at t1 decreases in every cycle. Therefore, the sub-harmonic oscillation can be suppressed. In order to reverse the essential relationship m1<m2, the output of the slope generator 6 (inclination: m3) is added to the output Vi of the current detection circuit 11 (inclination m1) to make m1+m3>m2. Such suppression of sub-harmonic oscillation is called slope compensation.

Figure 3:
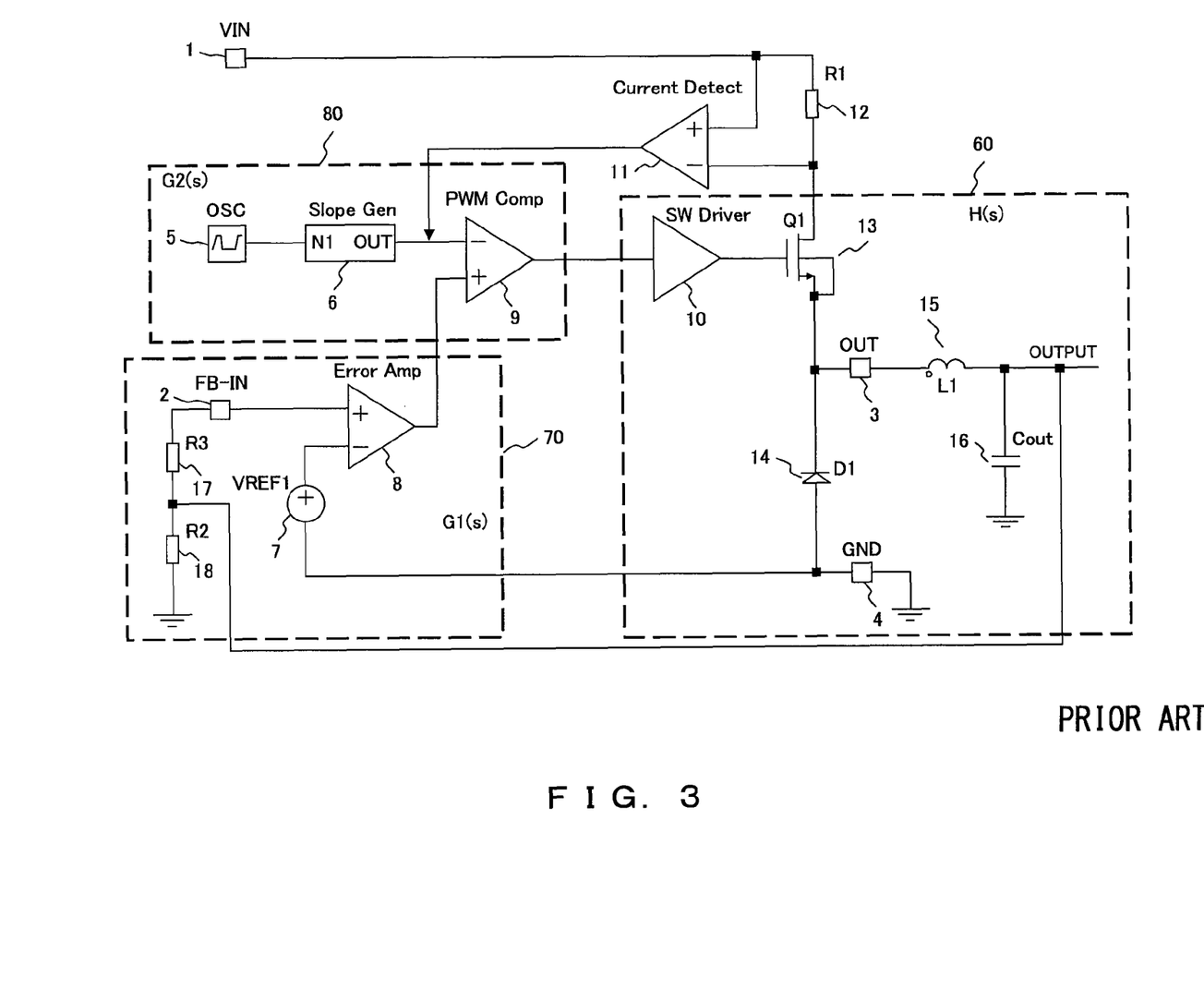
FIG. 3 shows a block diagram explaining the open loop transfer function L(s) of the circuit illustrated in FIG. 1.

Although such an additional function is necessary, the advantage of the current mode control is more than that and recently it has become an indispensable technology. Specifically, since the control loop of the DC-DC converter is a negative-feedback loop, in order to stably control it, it is necessary to secure phase redundancy and prevent sub-harmonic oscillation from occurring. Generally, it is difficult to solve the problem of oscillation due to phase rotation by the negative feedback of only a voltage component. The open loop transfer function L(s) of the circuit shown in FIG. 1 can be expressed as the product of each transfer function of the block diagram illustrated in FIG. 3 as follows.

$$L(s)=H(s)*G1(s)*G2(s) \quad (2)$$

In the block diagram illustrated in FIG. 3, blocks 60, 70 and 80 indicate the transfer functions H(s), G1(s) and G2(s), respectively, of Equation 2.

In this case, by using a signal proportional to the current of the inductor L1 (15) for a slope waveform to be inputted into the PWM comparator 9, a phase leading component is introduced and phase redundancy can be secured. For this reason, the current mode control is widely adopted.

Figure 4:
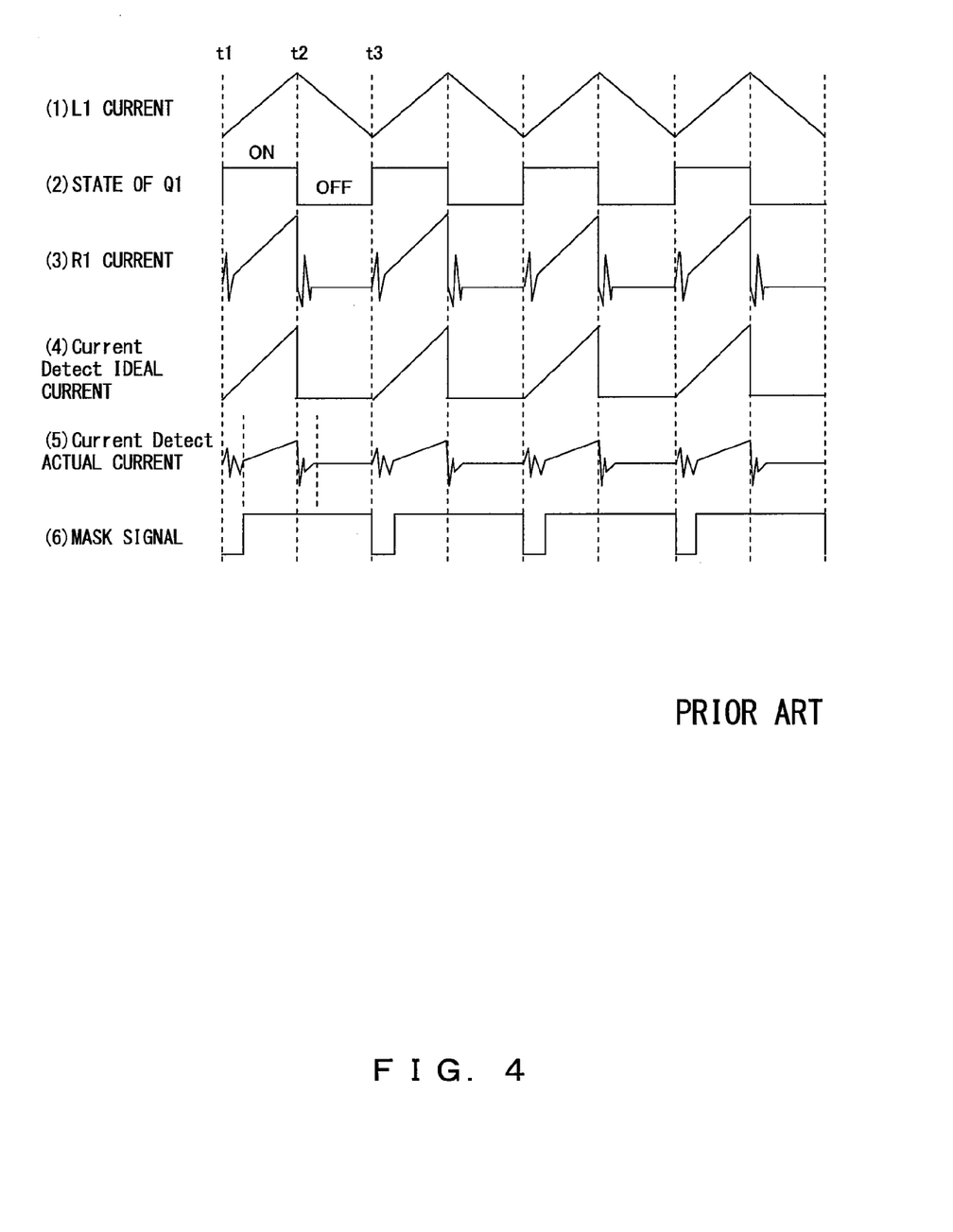
FIG. 4 illustrates waveforms in which noise generated from the switching device illustrated in FIG. 1 is masked.

The first problem of the configuration of the conventional current negative-feedback circuit and the DC-DC converter using the circuit that are illustrated in FIG. 1 is related to measuring high-side current by the current detection circuit (Current Detect) 11. Since the current detection resistor R1 (12) is located between the input power source terminal VIN 1 and the switching device Q1 (13), it is well known that current detection signal noise is generated by the on/off of the switching device Q1 (13). FIG. 4 illustrates waveforms in which noise generated the on/off of the switching device Q1 (13). As illustrated in the actual output waveform (5) of the Current Detect 11 of FIG. 4, noise is superimposed on the output waveform according to the on/off of the switching device Q1 (13). This situation makes the PWM comparator 9 malfunctions. Therefore, as illustrated in the mask signal (6) of FIG. 4, noise superimposed during the on period of the switching device Q1 (13) is prevented from entering the noise into the PWM comparator 9 by a mask signal. However, if a time of the noise superimposed is long, it affects the control operation. Therefore, sometimes the mask signal method cannot be used for a recent DC-DC converter whose clock frequency is high, that is, 1 MHz or more.

The second problem of the configuration of the conventional current negative-feedback circuit and the DC-DC converter using the circuit that are illustrated in FIG. 1 is that a Current Detect 11 whose slew rate (SR) is high is required since when the clock frequency increases, the operation frequency of the Current Detect 11 also increases. When the clock frequency is 1 MHz or more, in order to obtain an output waveform accurately proportional to the current of the inductor L1 (15); it is necessary for the performance of the slew rate SR to be several tens of V/µs to 100 V/µs or more, which leads an increase in the gradation of the consumption of electric power and an increase in the gradation of the conversion efficiency of electric power as a result.

As described above, Patent document 1 discloses a DC-DC converter for detecting current by the combination of a detection resistor and an operational amplifier, both provided on the high-potential side.

Patent document 2 also discloses a switching power source device in which the sub-harmonic oscillation of a pulse signal is suppressed.

Patent document 3 also discloses a DC-DC converter for converting the voltage of a detection resistor provided on the high potential side to current once and then restoring it to voltage again.

Although Patent document 1 discloses a technology for detecting current via the combination of a detection resistor and an operational amplifier that are provided on the high-potential side, this technology corresponds to the conventional art cited in this specification and is not useful for the solution of the above-described problems with the conventional art. Although Patent document 2 discloses a technology for suppressing the sub-harmonic oscillation of a pulse signal, it fails to disclose how to solve the slew rate SR problem and the switching noise problem. Since Patent document 3 uses an operational amplifier 34 (34 is the reference numeral in Patent document 3), the slew rate SR problem and the switching noise problem are left unsolved.

Patent document 1: Japanese Laid-open Patent Publication No. 2006-345628 (FIGS. 1 and 2)

Patent document 2: Japanese Laid-open Patent Publication No. 2004-40856 (FIG. 3, Para. 0055-0060)

Patent document 3: Japanese Laid-open Patent Publication No. 2001-245469 (FIGS. 1 and 2, Para. 0014-0016)

SUMMARY OF THE INVENTION

According to an aspect of the present invention, a current negative-feedback circuit of the present invention detects current proportional to the current during the charge period of the inductance by a current mirror circuit and generates a saw-tooth-shaped waveform, adding the output current of the current mirror circuit to the charge current of a sawtooth-shaped waveform generation circuit. Therefore, the speed of the current negative-feedback circuit can be improved by a simple circuit, the influence of the on/off noise of the switching device can be reduced without providing any special additional circuits, and the manufacturing cost of an IC can be reduced.

According to an aspect of the present invention, a DC-DC converter uses the above-described current negative-feedback circuit of the present invention. The DC-DC converter contains a current mirror circuit which detects current almost proportional to the inductance current during the charging period of an inductance or a current that is a quadratic function of the inductance current during the charging period of an inductance and outputs the current to a sawtooth-shaped waveform generation circuit, and the DC-DC converter generates a sawtooth-shaped waveform by adding the output current of the current mirror circuit to the charge current of the sawtooth-shaped waveform generation circuit. Therefore, the DC-DC converter can generate/output current almost proportional to an inductance current so as to perform current mode control at high speed or can generate/output current that is the quadratic function of the charge current during the charging period of an inductance by a simple circuit. Simultaneously, the DC-DC converter can reduce the influence of the on/off noise of the switching device without providing any special additional circuit and can reduce the manufacturing cost.

DESCRIPTION OF THE PREFERRED EMBODIMENTS

Preferred embodiments of the present invention will be explained with reference to accompanying drawings.

First Preferred Embodiment

Figure 5:
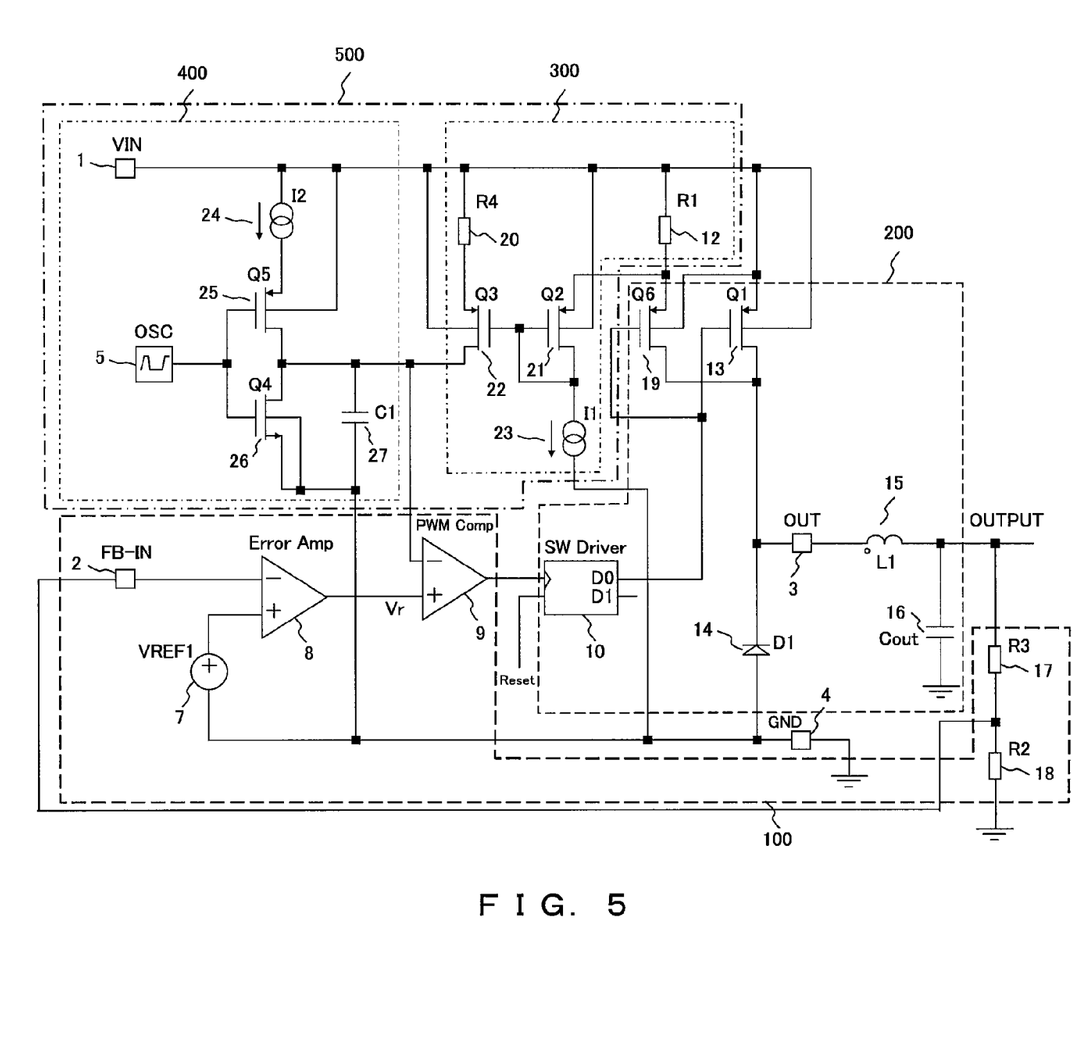
FIG. 5 shows the first preferred embodiment of a current negative-feedback circuit and a DC-DC converter using the circuit, according to the preferred embodiment of the present invention.

FIG. 5 shows the first preferred embodiment of a current negative-feedback circuit and a DC-DC converter using the circuit, according to the preferred embodiment of the present invention. In FIG. 5, the same reference numerals are attached to components common to those illustrated in FIG. 1. As in FIG. 1, the Error Amp 8, the reference voltage VREF1 (7), the PWM Comp 9 and the resistors R3 (17) and R2 (18) constitute the FB control unit 100, and the SW driver 10, the switching devices Q1 (13) and Q6 (19), the inductor L1 (15), the diode D1 (14), and the output capacitor Cout 16 constitute the output generation unit 200.

In FIG. 5, a constant current source I2 (24), a P-ch MOSFET Q5 (25) that is the first switching device and that becomes a charge route to a capacitor C1 (27), an N-ch MOSFET Q4 (26) that is the second switching device and that becomes a discharge route to a capacitor C1 (27), and a capacitor C1 (27) constitute a sawtooth-shaped waveform generation unit 400.

P-ch MOSFET is the abbreviation of a P-channel metal-oxide semiconductor field effect transistor and N-ch MOSFET is the abbreviation of an N-channel metal-oxide semiconductor field effect transistor.

In FIG. 5, when the output of the oscillator 5 is at a low level, the P-ch MOSFET Q5 (25) is switched on and the capacitor C1 (27) is charged with the current of the constant current source I2 (24). Thus, the voltage of the capacitor C1 (27) linearly increases, as illustrated by the dotted lines of the C1 voltage (5) in FIG. 8, which illustrates the operational waveform of each unit illustrated in FIG. 5. This relationship can be expressed as follows.

$$Vc = I24 * t / C1 \quad (3)$$

In the above equation, Vc, I24, C1 and t represent the potential (both-end voltage) of the capacitor C1 (27), the current of the constant current source I2 (24), the capacity of the capacitor C1 (27), and time, respectively.

Then, when the output of the oscillator 5 is at a high level, the P-ch MOSFET Q5 (25) is switched off. However, the N-ch MOSFET Q4 (26) is switched on and the charge of the capacitor C1 (27) is discharged via the N-ch MOSFET Q4 (26) so as to become zero. The low-level period of the output of the oscillator 5 is set to 10% or less of the high-level period and a sawtooth-shaped waveform is obtained as illustrated by the dotted lines of the C1 voltage (5) illustrated in FIG. 8, which illustrates the operational waveform of each unit illustrated in FIG. 5.

In FIG. 5, the first P-ch MOSFET Q2 (21) and the second P-ch MOSFET Q3 (22), which constitute the current mirror circuit, a current adjustment resistor R4 (20), a current detection resistor R1 (12), and a constant current source I1 (23), constitute a current detection unit 300. In FIG. 5, the second switching device P-ch MOSFET Q6 (19), which is in a similar relationship with the switching device P-ch MOSFET Q1 (13) (specifically, whose parameters other than size are the same) is connected in parallel with the P-ch MOSFET Q1 (13) (their gates and drains are commonly connected) and the current detection resistor R1 (12) is connected between the source of P-ch MOSFET Q6 (19) and the input power source terminal VIN1. The current detection resistor R1 (12) is used to detect current proportional to the charge current of the inductor L1 (15) as in FIG. 1. The above-described constitutions contribute to manufacturing the current detection resistor R1 (12) when it is manufactured as an IC, since the same large amount of current as the load current flows through the P-ch MOSFET Q1 (13) and a resistance value of 1 ohm or less is necessary when the current detection resistor R1 (12) is connected between the source of the P-ch MOSFET Q1 (13) and the input power source terminal VIN1 as illustrated in FIG. 1. As illustrated in FIG. 5, when the switching device P-ch MOSFET Q6 (19) is connected with the switching device P-ch MOSFET Q1 (13) in parallel and the size of the gate width of the switching device P-ch MOSFET Q6 (19) is made to be 1/N the size of the gate width of the switching device P-ch MOSFET Q1 (13), it is sufficient if the resistance value of the current detection resistor R1 (12) is N times resistance value and it can be easily manufactured using an IC. The above-described current detection unit 300 and the above-described sawtooth-shaped waveform generation unit 400 constitute a current negative-feedback circuit 500 according to the preferred embodiment of the present invention.

In FIG. 5, when the current of the current detection resistor R1 (12) increases, the output current of the current mirror circuit, that is, the drain current the P-ch MOSFET Q3 (22) increases. Both form a waveform illustrated in the R1 current (3) and Q3 current (4) of FIG. 8, which illustrates the operational waveform of each unit illustrated in FIG. 5. This relationship can be expressed as follows.

$$IQ3*R4+VGS(Q3)=(IQ2+IL1/N)*R1+VGS(Q2) \quad (4)$$

In the above equation, IQ3, IQ2, IL1, N, VGS(Q3), VGS (Q2), R4 and R1 represent the drain current of the P-ch MOSFET Q3 (22), the drain current of the P-ch MOSFET Q2 (21), which is the same as current I23 of the constant current source I1 (23), the current during the charge period of the inductor L1 (15), the ratio in gate width between the switching device P-ch MOSFET Q1 (13) and the switching device P-ch MOSFET Q6 (19)(in this example, both their gate lengths are equal), the voltage between the gate and source of the P-ch MOSFET Q3 (22), the voltage between the gate and source of the P-ch MOSFET Q2 (21), the resistance value of the current adjustment resistor R4 (20), and the resistance value of the current detection resistor R1 (12), respectively.

Therefore, Equation 4 is in an almost proportional relationship with the current of the inductor L1 (15) as illustrated in Equation 5. This will be described later.

$$IQ3=((I23+IL1/N)*R1+VGS(Q2)-VGS(Q3))/R4 \quad (5)$$

In FIG. 5, the output current IQ3 of the current mirror circuit is added to the current I24 of the constant current source I2 (24) for generating a sawtooth-shaped waveform and charges the capacitor C1 (27). As a result, the voltage waveform of the capacitor C1 (27) becomes the solid line of the C1 voltage (5) illustrated in FIG. 8, which illustrates the operational waveform of each unit illustrated in FIG. 5. The voltage Vc of the capacitor C1 (27) can be expressed as follows.

$$Vc=(1/C1)*\int(I24+IQ3)dt \quad (6)$$

When Equation 5 is complemented, the P-ch MOSFET Q2 (21) is diode-connected and its flowing current is constant current I1 specified by the constant current source I1 (23). Therefore, the voltage between the gate and source is constant. Specifically, VGS (Q2)=const.

However, if it is assumed that the P-ch MOSFET Q3 (22) is operated in a saturation area, the relationship between IQ3 and VGS (Q3) becomes as follows.

$$IQ3=K*(VGS(Q3)-VT)^2 \quad (7)$$

In the above equation, K represents a constant determined by the channel length, the channel width, the degree of carrier mobility, and the oxidized gate film capacity per unit area of the P-ch MOSFET Q3 (22) and VT represents the threshold voltage of the P-ch MOSFET Q3 (22). Since it is assumed that the capacitor C1 (27) is discharged and then is charged, it can be considered that the voltage between the source and drain of the P-ch MOSFET Q3 (22) is sufficiently large and that the P-ch MOSFET Q3 (22) is operated in a saturation area.

When Equation 7 is transformed, Equation 8 becomes as follows:

$$VGS(Q3)=(IQ3/K)^{1/2}+VT \quad (8)$$

Specifically, in Equation 5, while the first term on the right side (the term multiplied by R1) is the linear expression of IL1, the second term on the right side is the expression of ½ degree of IQ3. Therefore, if the change of the second term can be neglected against the change of the first term, Equation 5 can be approximated as a linear equation. Naturally, IQ3 can be strictly obtained by assigning Equation 5 to Equation 8 (If $(IQ3)^{1/2}$ is replaced with x, Equation 5 becomes a quadratic expression of x. It is acceptable if x is calculated according to this quadratic expression of x and it is squared.). Although the strict solution is not the linear expression of IL1, it increases monotonically against IL1 (the equation becomes IQ3=A (IL1+(IL1+B)$^{1/2}$+C)$^2$; in this equation, A, B and C are constants.). Thus, it is found that the drain current IQ3 of the P-ch MOSFET Q3 (22) is almost proportional to the current IL1 of the inductor L1 (15).

Figure 8:
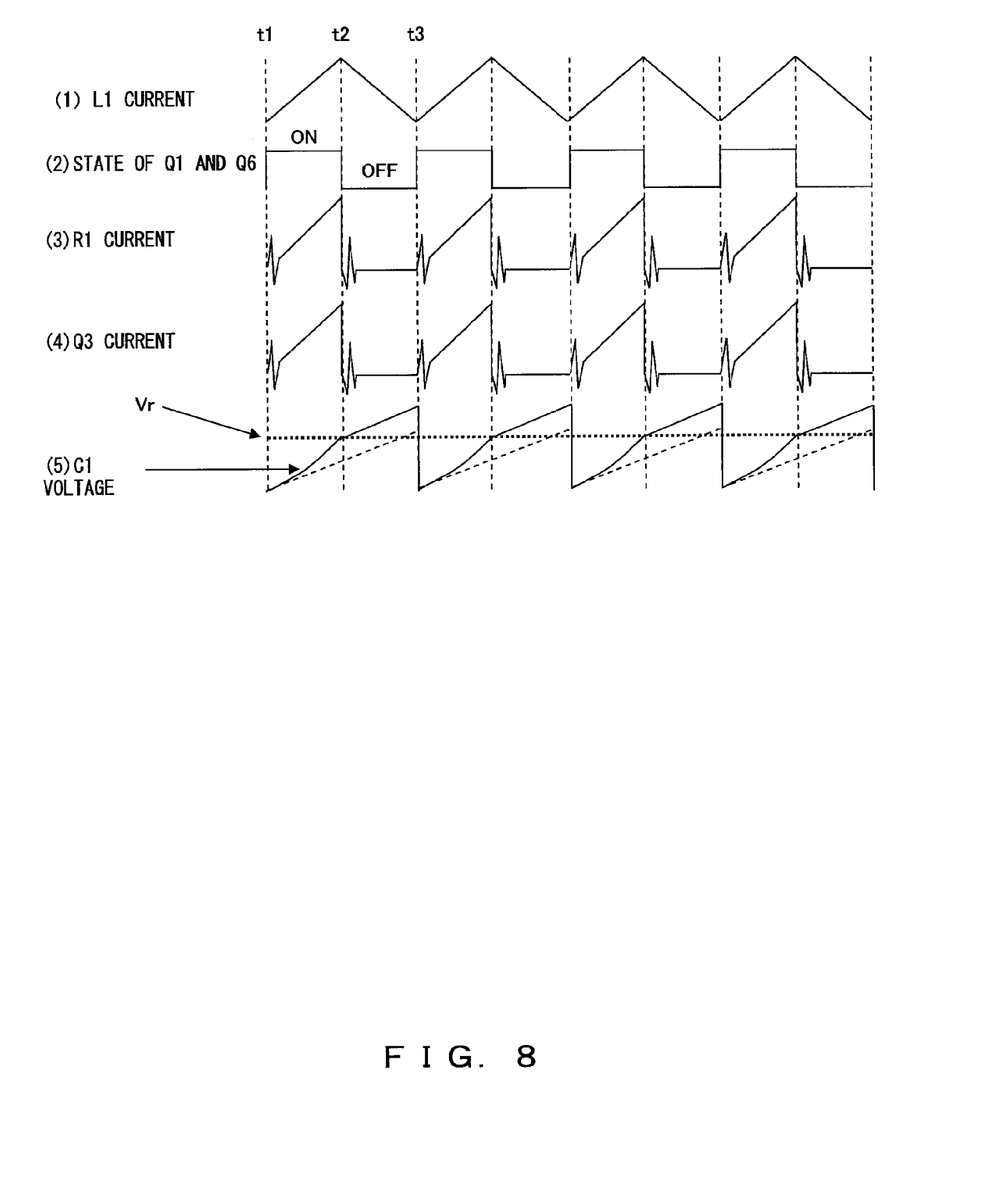
FIG. 8 illustrates the operational waveform of each unit illustrated in FIG. 5.

When as a result of a charge, the potential of the capacitor C1 (27) increases and becomes equal to the output voltage Vr of the error amplifier 8, the PWM comparator 9 inverts to switch the switching devices Q1 (13) and Q6 (19) off via the SW Driver 10 (see t2 illustrated in FIG. 8). After t2 illustrated in FIG. 8, since the output current of the current mirror circuit becomes zero, the capacitor C1 (27) is charged with only the current of the constant current source I2 (24) (strictly speaking, the contribution (constant current) of the constant current source I1 (23) via the current mirror circuit is also added, including Equation 3) and increases with the same inclination as the dotted line of the C1 voltage (5) illustrated in FIG. 8, which illustrates the operational waveform of each unit illustrated in FIG. 5.

This means that the charge voltage of the capacitor C1 (27) charged by the current of the constant current source I2 (24) is a signal for compensating for a slope and its inclination corresponds to the inclination m3 of the output of the slope generator 6. Specifically, it brings about the same effect as superimposing the output of the slope generator 6 for compensation for a slope to Vi in FIG. 1. Since the voltage of the capacitor C1 (27) obtained by charging of the drain current IQ3 of the P-ch MOSFET Q3 (22), which is almost proportional to the current IL1 of the inductor L1 (15), is handled as a current signal, the current signal is proportional to the squared current IL1 of the inductor L1 (15). Since the switching operation is controlled by comparing a signal obtained by adding both the signals and the signal Vr that are the output of the Error Amp 8 using the PWM Comp 9, the size relationship between the inclination of (m1*t$^2$+m3*t) and m2 determines the sub-harmonic oscillation if the same reference numerals are used as those used in the description of the above-described sub-harmonic oscillation and slope compensation. Since (m1*t$^2$+m3*t) includes the higher-degree term of time t, the inclination increases as time elapses. Therefore, a condition for preventing sub-harmonic oscillation from occurring of (inclination of (m1*t$^2$+m3*t))>m$^2$ is easily established.

As illustrated in FIG. 8, which illustrates the operational waveform of each unit illustrated in FIG. 5, noise is superimposed on the R1 current (3) and the Q3 current (4) accompanying the on/off of the switching devices Q1 (13) and Q6 (19). However, as illustrated in Equation 6, the voltage Vc of the capacitor C1 (27) is obtained by the integration of charge current, and noise current is averaged to an almost negligible level as illustrated in the C1 voltage (5) of FIG. 8 when the capacitor C1 (27), which is one component of the sawtooth-shaped waveform generation unit 400, is charged. Therefore, no mask signal for masking noise as illustrated in FIG. 2 is needed. Furthermore, in the case of the current mirror circuit illustrated in FIG. 5, unlike the operational amplifier type Current Detect 11 illustrated in FIG. 1, there is actually no constraint due to a slew rate and no waveform deterioration.

Although in the above description, the current adjustment resistor R4 (20) is always needed as a component constituting the current detection unit 300, the current adjustment resistor R4 (20) can also be omitted. Specifically, when there is no current adjustment resistor R4 (20), Equation 4 becomes as follows.

$$VGS(Q3)=(I23+IL1/N)*R1+VGS(Q2) \quad (9)$$

When Equation 8 is assigned to Equation 9, it becomes as follows. In the following equation, I23 is the current of the constant current source I1 (23).

$$(IQ3/K)^{1/2}=(I23+IL1/N)*R1+VGS(Q2)-VT$$

Thus, IQ3 can be expressed as follows.

$$IQ3=K*((I23+IL1/N)*R1+VGS(Q2)-VT)^2 \quad (10)$$

Since VGS (Q2)=const. and I23 and VT are constants, as described above, Equation 10 becomes the quadratic function of IL1. Therefore, if there is no current adjustment resistor R4 (20), IQ3 is more strongly affected by the current IL1 of the inductor L1 (15).

Second Preferred Embodiment

Figure 6:
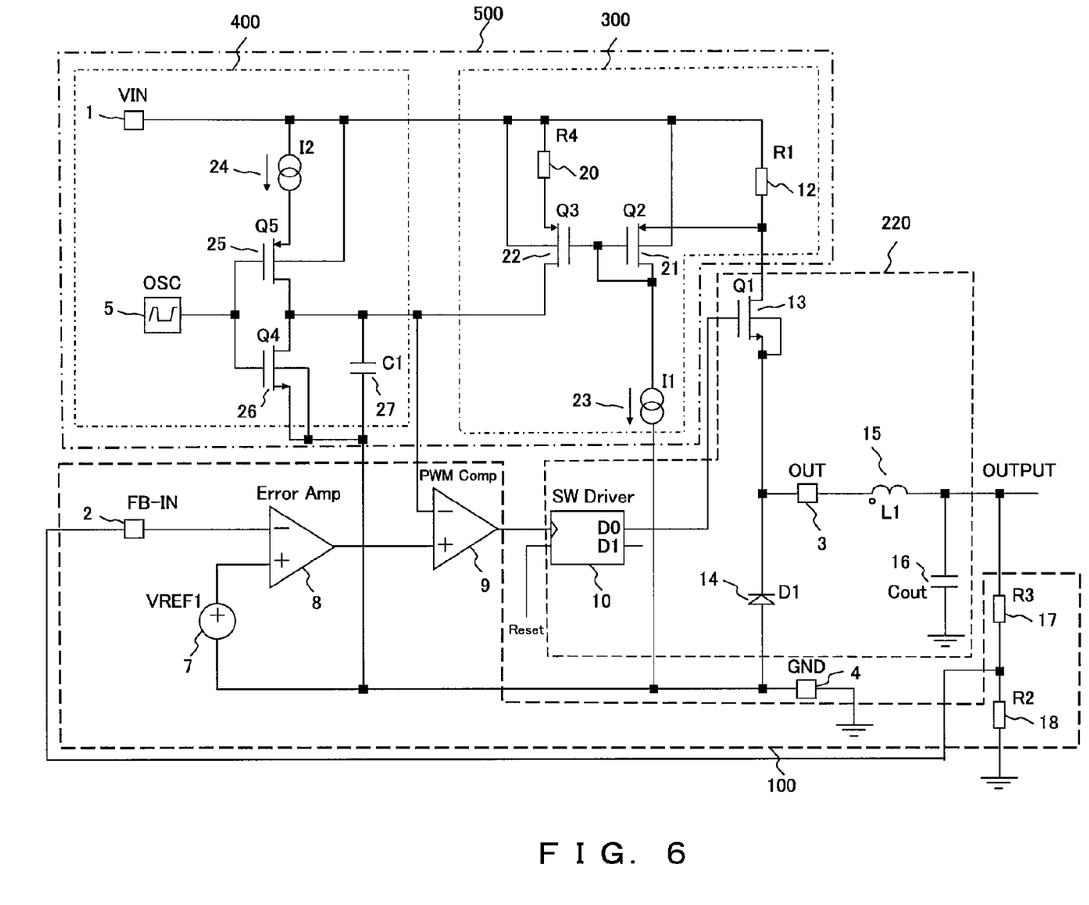
FIG. 6 shows the second preferred embodiment of a current negative-feedback circuit and a DC-DC converter using the circuit, according to the preferred embodiment of the present invention.

FIG. 6 shows the second preferred embodiment of a current negative-feedback circuit and a DC-DC converter using the circuit, according to the preferred embodiment of the present invention, in which the switching device Q1 (13) illustrated in FIG. 5 is composed of an N-ch MOSFET instead of the P-ch MOSFET. In FIG. 6, the same reference numerals are attached to components common to those in FIG. 5. The Error Amp 8, the reference voltage VREF1 (7), the PWM Comp 9, and the resistors R3 (17) and R2 (18) constitute the FB control unit 100, and the SW Driver 10, the switching device Q1 (13) composed of an N-ch MOSFET, the inductor L1 (15), the diode D1 (14), and the output capacitor Cout 16 constitute the output generation unit 220, which is almost the same as in FIG. 5. As in FIG. 5, the current detection unit 300 and the sawtooth-shaped waveform generation unit 400 constitute the current negative-feedback circuit 500 according to the preferred embodiment of the present invention.

Since the amount of carrier mobility of an N-ch MOSFET is three times larger than that of a P-ch MOSFET, the IC area of the N-ch MOSFET is ⅓ that of a P-ch MOSFET. Because of this reason, in the output generation unit 220 of FIG. 6, the switching device Q1 (13) is composed of an N-ch MOSFET. For this reason, in many recent cases, an N-ch MOSFET has been used in the Hi-Side of the DC-DC converter. In FIG. 6, current almost proportional to the charge current of the inductance is generated/outputted by a current mirror circuit composed of the current detection resistor R1 (12) inserted between the drain of the switching device Q1 (13) and the input power terminal VIN1, a P-ch MOSFET Q2 (21), a P-ch MOSFET Q3 (22), the current adjustment resistor R4 (20), and the constant current source I1 (23), as in FIG. 5. As in the first preferred embodiment, the current adjustment resistor R4 (20) can also be omitted. The reason has already been described in the first preferred embodiment.

Third Preferred Embodiment

Figure 7:
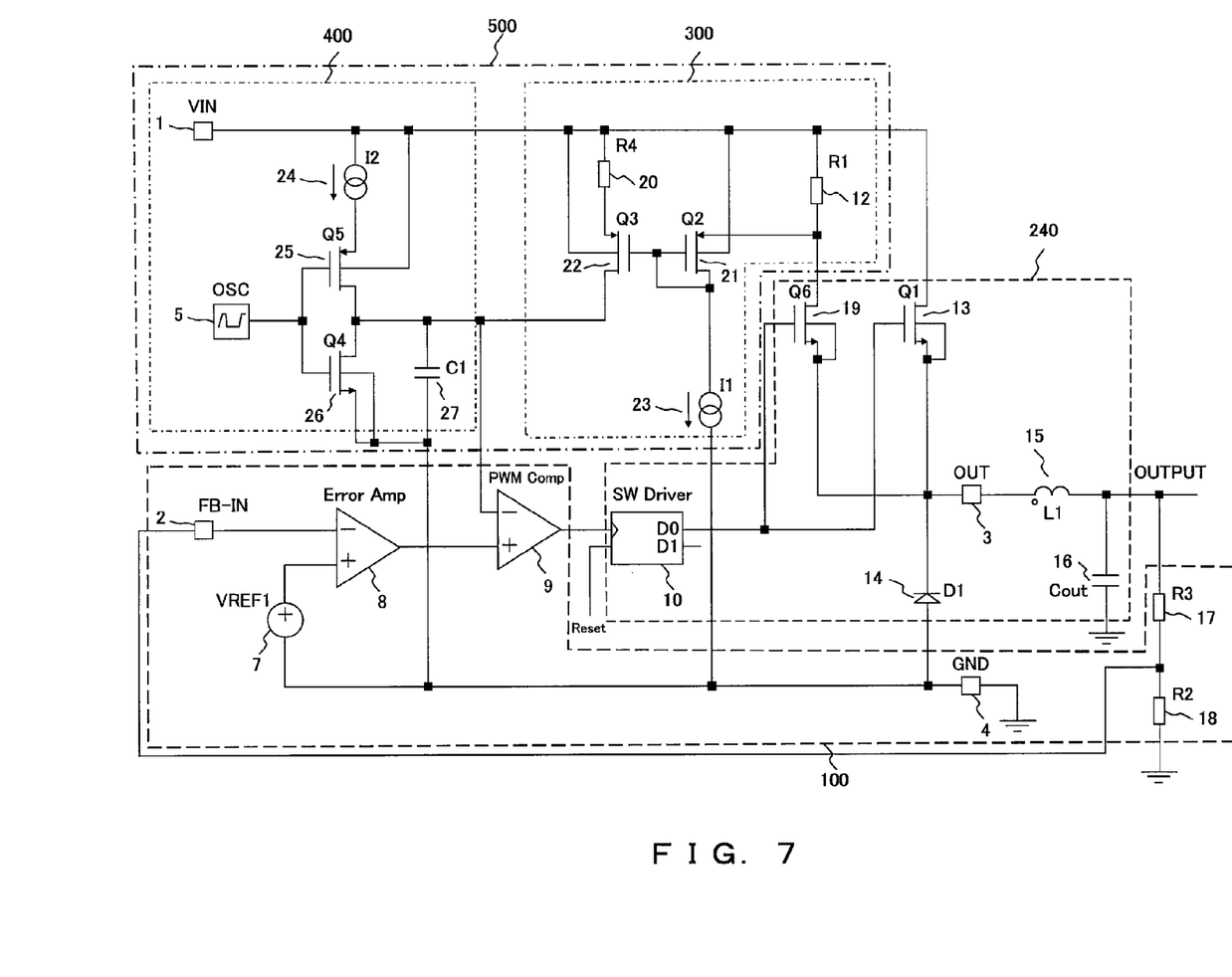
FIG. 7 shows the third preferred embodiment of a current negative-feedback circuit and a DC-DC converter using the circuit, according to the preferred embodiment of the present invention.

In the second preferred embodiment illustrated in FIG. 6, as described above, it is feared that since the inductance current IL1 is large, the value of the current detection resistor R1 (12) will be so small that it will be difficult to manufacture it as an IC. Therefore, in the third preferred embodiment of a current negative-feedback circuit and a DC-DC converter using the circuit according to the preferred embodiment of the present invention illustrated in FIG. 7, a switching device Q6 (19), which is the same as the switching device Q1 (13) except that it has a gate width of 1/N that of the switching device Q1 (13), is connected to the switching device Q1 (13) in parallel (their gates and sources are commonly connected), the current detection resistor R1 (12) is inserted between the drain of the switching device Q6, and the input power terminal VIN1 and a current almost proportional to the charge current of the inductance is generated/outputted via the current mirror circuit. In FIG. 7, the same reference numerals are attached to components common to those in FIG. 6. The Error Amp 8, the reference voltage VREF1 (7), the PWM Comp 9, and the resistors R3 (17) and R2 (18) constitute the FB control unit 100, and the SW Driver 10, the switching devices Q1 (13) and Q6 (19) composed of N-ch MOSFETs, the inductor L1 (15), the diode D1 (14), and the output capacitor Cout 16 constitute the output generation unit 240, which is almost the same as in FIG. 6. As in FIG. 6, the current detection unit 300 and the sawtooth-shaped waveform generation unit 400 constitute the current negative-feedback circuit 500 according to the preferred embodiment of the present invention.

As in the second preferred embodiment, the current adjustment resistor R4 (20) can also be omitted. The reason has already been described in the first preferred embodiment.

Fourth Preferred Embodiment

Figure 9:
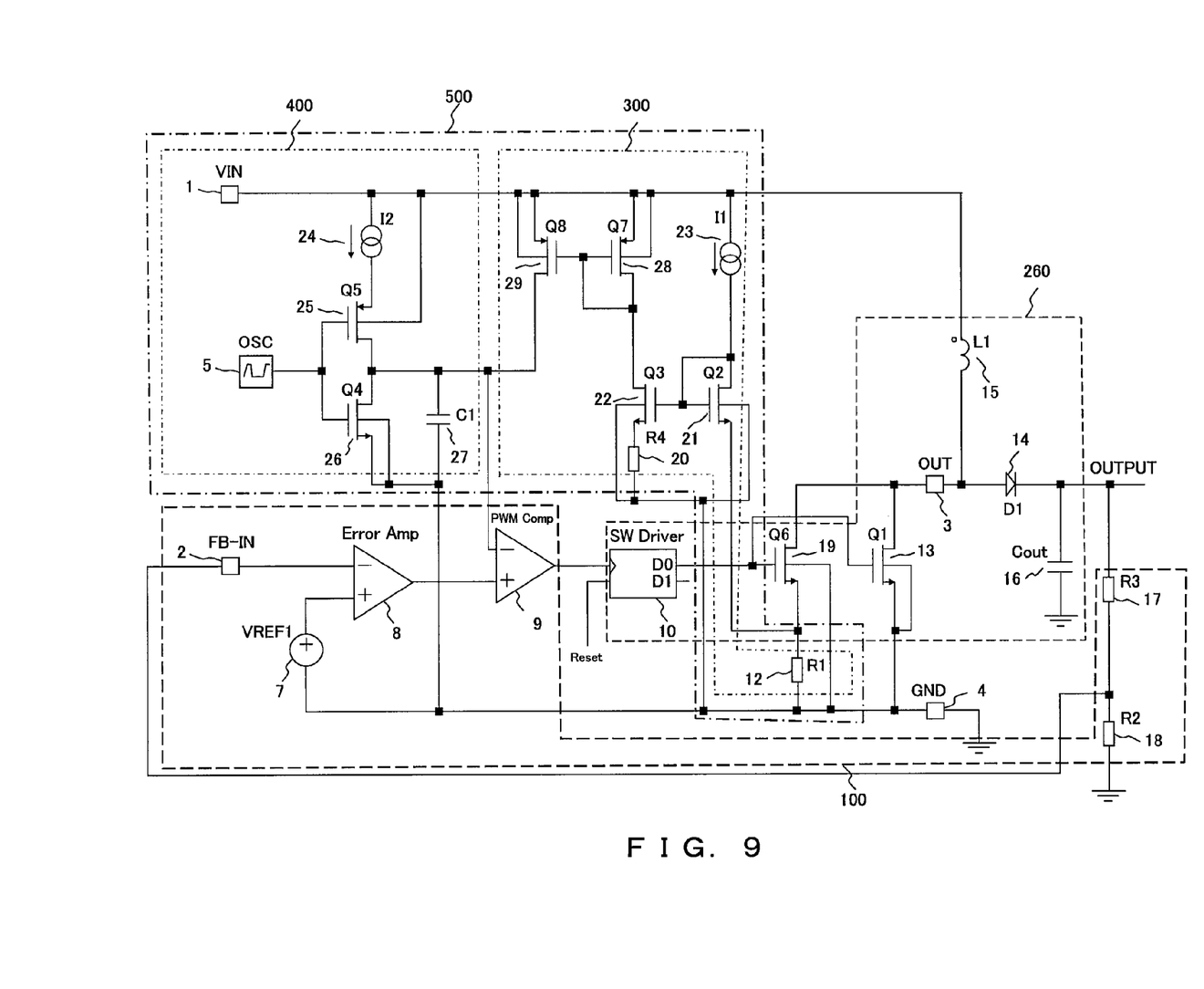
FIG. 9 shows the fourth preferred embodiment of a current negative-feedback circuit and a DC-DC converter using the circuit, according to the preferred embodiment of the present invention.

FIG. 9 shows the fourth preferred embodiment of a current negative-feedback circuit and a DC-DC converter using the circuit, according to the preferred embodiment of the present invention, in which a boost type DC-DC converter is used for the DC-DC converter using a current negative-feedback circuit according to the preferred embodiment of the present invention described with reference to FIG. 5. In FIG. 9, the same reference numerals are attached to components common to those in FIG. 7. The Error Amp 8, the reference voltage VREF1 (7), the PWM Comp 9, and the resistors R3 (17) and R2 (18) constitute the FB control unit 100, and the SW Driver 10, the switching devices Q1 (13) and Q6 (19) composed of N-ch MOSFETs, the inductor L1 (15), the diode D1 (14), and the output capacitor Cout 16 constitute the output generation unit 260, which is almost the same as in FIG. 7. As in FIG. 7, the current detection unit 300 and the sawtooth-shaped waveform generation unit 400 constitute the current negative-feedback circuit 500 according to the preferred embodiment of the present invention.

When the boost type DC-DC converter is used, the current detection unit 300 illustrated in FIG. 9 comprises a current detection resistor 12, an N-ch MOSFET 21, an N-ch MOSFET 22, a P-ch MOSFET 28, and a P-ch MOSFET 29 which constitute two current mirror circuits, a current adjustment resistor 20 and a constant current source 23. As in the second and third preferred embodiments, the current adjustment resistor R4 (20) can also be omitted. The reason has already been described in the first preferred embodiment. As in the above-described preferred embodiments, a current almost proportional to the charge current of the inductor L1 (15) (a quadratic function of the charge current of the inductor L1 (15) when there is no current adjustment resistor R4 (20)) is generated/outputted by the current mirror circuit composed of the N-ch MOSFET 21 and the N-ch MOSFET 22. Then, the current mirror circuit composed of the P-ch MOSFET 28 and the P-ch MOSFET 29 copies the current and supplies it to the capacitor C1 (27).

The boost type DC-DC converter illustrated in FIG. 9 can be controlled in the same way as the buck type DC-DC converter by replacing the P-ch MOSFET Q1 (13), P-ch MOSFET Q6 (19), P-ch MOSFET Q2 (21), and P-ch MOS- FET Q3 (22) with N-ch MOSFETs and replacing a power source with a GND. Furthermore, in order to supply charge current to the capacitor C1 (27), a current mirror circuit composed of the P-ch MOSFET Q7 (28) and the P-ch MOSFET Q8 (29) is added. Thus, a boost type DC-DC converter can be realized by the same method as the buck type DC-DC converter.

In any of the above-described preferred embodiments, the diode D1 (14) can be also replaced with a synchronous rectifier device, such as an N-ch MOSFET or the like.

What is claimed is:

1. A current negative-feedback circuit comprising a sawtooth-shaped waveform generation means for generating a sawtooth-shaped waveform and inputting it into a PWM comparator provided for a control means for storing energy in an inductance by switching a switching device on/off and controlling a series of converter sequences discharging the energy to a load, said circuit comprising
    current detection means for detecting a charge current of the inductance, wherein
    said current detection means comprises a current mirror circuit for outputting a current proportional to the charge current of the inductance via the switching device or for outputting a current which is a quadratic function of the charge current of the inductance,
    said sawtooth-shaped waveform generation means comprises an oscillator, a constant-current source, first and second MOSFETs which are complementary, and charge/discharge means provided with a capacitor, so as to discharge the capacitor or charge it with constant current by complementarily switching the first and second MOSFETs on/off according to an oscillation output of the oscillator and
    said sawtooth-shaped waveform generation means adds constant charge current of the charge/discharge means and current output from the current mirror circuit, charges the capacitor, and generates a sawtooth-shaped waveform.

2. The current negative-feedback circuit according to claim 1, wherein
    said current mirror circuit comprises third and fourth MOSFETs; gates of the third and fourth MOSFETs are connected to a drain of the third MOSFET; the current detection means is a current detection resistor connected between a source of at least one of the MOSFETs except for the third MOSFET constituting the switching device, a source of the third MOSFET, and an input power source terminal; a constant current source is connected to a drain of the third MOSFET; and a drain of the fourth MOSFET is connected to the capacitor of the sawtooth-shaped waveform generation means directly or via the second current mirror circuit.

3. A DC-DC converter comprising control means provided with a switching device for storing energy in an inductance by switching a switching device on/off and controlling a series of converter sequences discharging the energy to a load, said DC-DC converter comprising
    output generation means comprising a driver for controlling an on/off of the switching device, first and second P-ch MOSFETs constituting the switching device, an inductor, and an output capacitor for storing energy in the inductor by switching the switching device on/off and discharging the energy to the load;
    control means comprising at least a PWM comparator for outputting a signal for controlling the driver, so as to control a series of converter sequences of the output generation means;
    current negative-feedback circuit comprising a current detection means and a sawtooth-shaped waveform generation means, said current detection means for generating and outputting current proportional to a charge current of an inductance via the switching device or for outputting a current which is a quadratic function of the charge current of the inductance to a PWM comparator provided with the control means, and said sawtooth-shaped waveform generation means comprising a charge/discharge means for discharging a capacitor or charging it with a constant current by complementarily switching the first and second MOSFETs according to an oscillation output of an oscillation, for adding a constant current of the charge/discharge means and current output from the current mirror circuit, charging the capacitor, and generating and inputting a sawtooth-shaped waveform.

4. The DC-DC converter according to claim 3, wherein
    a gate width of the second P-ch MOSFET provided for the output generation means is set to 1/N of a gate width of the first P-ch MOSFET, the first and second P-ch MOSFETs are connected in parallel, and a current detection resistor is inserted between a source of the second P-ch MOSFET and an input power source terminal.

5. A DC-DC converter comprising control means provided with a switching device, for storing energy in an inductance by switching a switching device on/off and controlling a series of converter sequences discharging the energy to a load, said DC-DC converter comprising
    output generation means comprising a driver for controlling an on/off of the switching device, an N-ch MOSFET constituting the switching device, an inductor, and an output capacitor for storing energy in the inductor by switching the switching device on/off and discharging the energy to the load;
    control means comprising at least a PWM comparator for outputting a signal for controlling the driver, for controlling a series of converter sequences of the output generation means;
    current negative-feedback circuit comprising a current detection means and a sawtooth-shaped waveform generation means, said current detection means for generating and outputting current proportional to a charge current of an inductance via the switching device or for outputting a current which is a quadratic function of the charge current of the inductance to a PWM comparator provided with the control means, and said sawtooth-shaped waveform generation means comprising a charge/discharge means for discharging a capacitor or charging it with a constant current by complementarily switching the first and second MOSFETs according to an oscillation output of an oscillation, so as to add a constant current of the charge/discharge means and current output from the current mirror circuit, charging the capacitor, and generating and inputting a sawtooth-shaped waveform.

6. The DC-DC converter according to claim 5, wherein
    a second N-ch MOSFET connected in parallel to an N-ch MOSFET constituting the switching device provided for the output generation means is provided, a gate width of the second N-ch MOSFET is set to 1/N of a gate width of the N-ch MOSFET, and a current detection resistor is inserted between a source of the second N-ch MOSFET and an input power source terminal.

7. A DC-DC converter comprising control means provided with a switching device, for storing energy in an inductance by switching a switching device on/off and controlling a series of converter sequences discharging the energy to a load, said DC-DC converter comprising
- output generation means comprising a driver for controlling an on/off of the switching device, a first and second N-ch MOSFET constituting the switching device, an inductor, and an output capacitor for storing energy in the inductor by switching the switching device on/off, superimposing the energy onto energy supplied from an input power source and discharging the energy to the load;
- control means comprising at least a PWM comparator for outputting a signal for controlling the driver, so as to control a series of converter sequences of the output generation means;
- current negative-feedback circuit comprising a current detection means and a sawtooth-shaped waveform generation means, said current detection means for generating and outputting current proportional to charge current of an inductance via the switching device or outputting a current which is a quadratic function of the charge current of the inductance to a PWM comparator provided with the control means, and said sawtooth-shaped waveform generation means comprising a charge/discharge means for discharging a capacitor or charging it with constant current by complementarily switching the first and second MOSFET according to oscillation output of an oscillation, for adding the constant current of the charge/discharge means and a current detected by the current mirror circuit, charging the capacitor, and generating and inputting a sawtooth-shaped waveform.

8. The DC-DC converter according to claim 7, wherein a gate width of the second N-ch MOSFET constituting the switching device provided for the output generation means is set to 1/N of a gate width of the N-ch MOSFET, the first and second N-ch MOSFET are connected in parallel, and a current detection resistor is connected between a source of the second N-ch MOSFET and an input power source terminal.

9. The DC-DC converter according to claim 7, wherein two stages of a current mirror circuit constituting the current detection means are provided, a first stage of a current mirror circuit being composed of two N-ch MOSFETs, a second stage of a current mirror circuit being composed of two P-ch MOSFETs, and a current generated and outputted by the first stage of the current mirror circuit ,provides to a capacitor via second stage of the current mirror circuit, which the current is proportional to a charge current of an inductance via the switching device or is a quadratic function of the charge current of the inductance.

\* \* \* \* \*